(12) United States Patent
Halvorsen et al.

(10) Patent No.: US 11,448,368 B2
(45) Date of Patent: Sep. 20, 2022

(54) SENSOR MOUNTING SYSTEM

(71) Applicant: Hexagon Technology AS, Alesund (NO)

(72) Inventors: Ken Halvorsen, Lincoln, NE (US); Brian Burks, Centennial, CO (US); Ryan Crocker, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 0 days.

(21) Appl. No.: 17/158,204

(22) Filed: Jan. 26, 2021

(65) Prior Publication Data

US 2021/0148516 A1 May 20, 2021

Related U.S. Application Data

(62) Division of application No. 16/190,303, filed on Nov. 14, 2018, now Pat. No. 10,928,010.

(Continued)

(51) Int. Cl.
*F17C 13/08* (2006.01)
*F17C 1/00* (2006.01)
(Continued)

(52) U.S. Cl.
CPC .............. *F17C 13/08* (2013.01); *F17C 1/002* (2013.01); *F17C 13/02* (2013.01); *F17C 13/025* (2013.01);
(Continued)

(58) Field of Classification Search
CPC .......... F17C 13/08; F17C 1/002; F17C 13/02; F17C 13/025; F17C 13/083;
(Continued)

(56) References Cited

U.S. PATENT DOCUMENTS 5,088,207 A * 2/1992 Betsill ................... G01B 5/201
33/1 BB
5,335,422 A * 8/1994 Ferguson ............... G01B 5/08
33/553

(Continued)

FOREIGN PATENT DOCUMENTS

CN 102556524 A 7/2012
CN 103037136 A 4/2013
(Continued)

OTHER PUBLICATIONS

First Examination Report for Indian Patent Application No. 202047023991, dated Feb. 23, 2022, 6 pages.

(Continued)

*Primary Examiner* — Christopher Garft
(74) *Attorney, Agent, or Firm* — Mai-Tram D. Lauer; Westman, Champlin & Koehler, P.A.

(57) ABSTRACT

A sensor mounting assembly is configured for use with a vessel arrangement including at least four vessels. The assembly includes first and second elongated frame members, first and second rollers, and first and second sensors. The first sensor is attached to the first elongated frame member and is configured to contact the surface of the first vessel upon actuation in a first direction. The second sensor is attached to the second elongated frame member and is configured to contact the surface of the second vessel upon actuation in a second direction that is substantially orthogonal to the first direction. This disclosure also describes a method of mounting at least six sensors for use with a vessel arrangement including at least four vessels, the vessel arrangement disposed in a container in a two-by-two stacked configuration having a central space.

16 Claims, 14 Drawing Sheets

Related U.S. Application Data

(60) Provisional application No. 62/585,671, filed on Nov. 14, 2017.

(51) Int. Cl.
*F17C 13/02* (2006.01)
*G01D 11/30* (2006.01)

(52) U.S. Cl.
CPC ............ *F17C 13/083* (2013.01); *G01D 11/30* (2013.01); *F17C 2201/0109* (2013.01); *F17C 2201/0119* (2013.01); *F17C 2201/035* (2013.01); *F17C 2201/054* (2013.01); *F17C 2205/013* (2013.01); *F17C 2205/0107* (2013.01); *F17C 2205/0157* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01); *F17C 2223/035* (2013.01); *F17C 2250/043* (2013.01); *F17C 2250/0465* (2013.01); *F17C 2250/0491* (2013.01); *F17C 2260/015* (2013.01); *F17C 2270/011* (2013.01); *F17C 2270/0105* (2013.01); *F17C 2270/0171* (2013.01); *F17C 2270/0173* (2013.01)

(58) Field of Classification Search
CPC ...... F17C 2201/0109; F17C 2201/0119; F17C 2201/035; F17C 2201/054; F17C 2205/0107; F17C 2205/013; F17C 2205/0157; F17C 2221/011; F17C 2221/012; F17C 2221/014; F17C 2221/033; F17C 2221/035; F17C 2250/043; F17C 2250/0465; F17C 2250/0491; F17C 2260/015; F17C 2270/0105; F17C 2270/011; F17C 2270/0171; F17C 2270/0173; F17C 2223/0123; F17C 2223/035; G01D 11/30; B60P 3/2215
See application file for complete search history.

(56) References Cited

U.S. PATENT DOCUMENTS

| | | | | |
|---|---|---|---|---|
| 5,535,143 A * | 7/1996 | Face | ...................... | G01B 5/201 73/104 |
| 5,535,628 A * | 7/1996 | Rutherford | .......... | G01N 29/225 73/622 |
| 6,782,631 B1 * | 8/2004 | Face, III | .................. | G01C 7/04 33/501.02 |
| 7,040,070 B2 | 5/2006 | Yuyama et al. | | |
| 7,159,477 B2 * | 1/2007 | Edwin | .................... | G01B 7/281 73/865.8 |
| 8,780,415 B2 | 7/2014 | Osakabe et al. | | |
| 8,982,429 B2 | 3/2015 | Osakabe et al. | | |
| 9,131,102 B2 | 9/2015 | Osakabe et al. | | |
| 9,261,386 B2 | 2/2016 | Carter | | |
| 9,376,049 B2 * | 6/2016 | Campbell | ................. | B65B 3/04 |
| 9,429,206 B2 | 8/2016 | Bothien et al. | | |
| 9,621,751 B2 | 4/2017 | Osakabe et al. | | |
| 9,769,340 B2 | 9/2017 | Osakabe et al. | | |
| 9,921,237 B2 | 3/2018 | Kuster | | |
| 10,288,455 B2 | 5/2019 | Daton-Lovett | | |
| 2004/0075034 A1 | 4/2004 | Yokote | | |
| 2013/0083371 A1 | 4/2013 | Osakabe et al. | | |
| 2014/0090467 A1 | 4/2014 | Carter | | |
| 2014/0191499 A1 * | 7/2014 | Campbell | ............. | B60P 3/2205 53/473 |
| 2014/0320936 A1 | 10/2014 | Osakabe et al. | | |
| 2014/0346313 A1 | 11/2014 | Bothien et al. | | |
| 2015/0195420 A1 | 7/2015 | Osakabe et al. | | |
| 2015/0343498 A1 | 12/2015 | Kieser | | |
| 2015/0381836 A1 | 12/2015 | Osakabe et al. | | |
| 2016/0146847 A1 | 5/2016 | Kuster | | |
| 2017/0016746 A1 | 1/2017 | Daton-Lovett | | |
| 2017/0208197 A1 | 7/2017 | Osakabe et al. | | |

FOREIGN PATENT DOCUMENTS

| | | |
|---|---|---|
| CN | 103649614 A | 3/2014 |
| CN | 104062064 A | 9/2014 |
| CN | 104180835 A | 12/2014 |
| CN | 204388882 U | 6/2015 |
| CN | 105067020 A | 11/2015 |
| CN | 105393089 A | 3/2016 |
| CN | 106104215 A | 11/2016 |
| CN | 106197509 A | 12/2016 |
| EA | 001857 B1 | 8/2001 |
| EP | 2354625 A1 | 8/2011 |
| JP | S59-35139 A | 2/1984 |
| JP | 2012-65669 A | 4/2012 |
| RU | 2217741 C2 | 11/2003 |
| RU | 2470274 C1 | 12/2012 |
| TW | 419023 U | 1/2001 |
| WO | 2014/114469 A | 7/2014 |

OTHER PUBLICATIONS

Office Action for Russian Patent Application No. 2020117513/28(029444), dated Jan. 31, 2022, 16 pages.
First Office Action, including search report, for Chinese Patent Application No. 201880073602.6, dated Aug. 11, 2021, 16 pages.

* cited by examiner

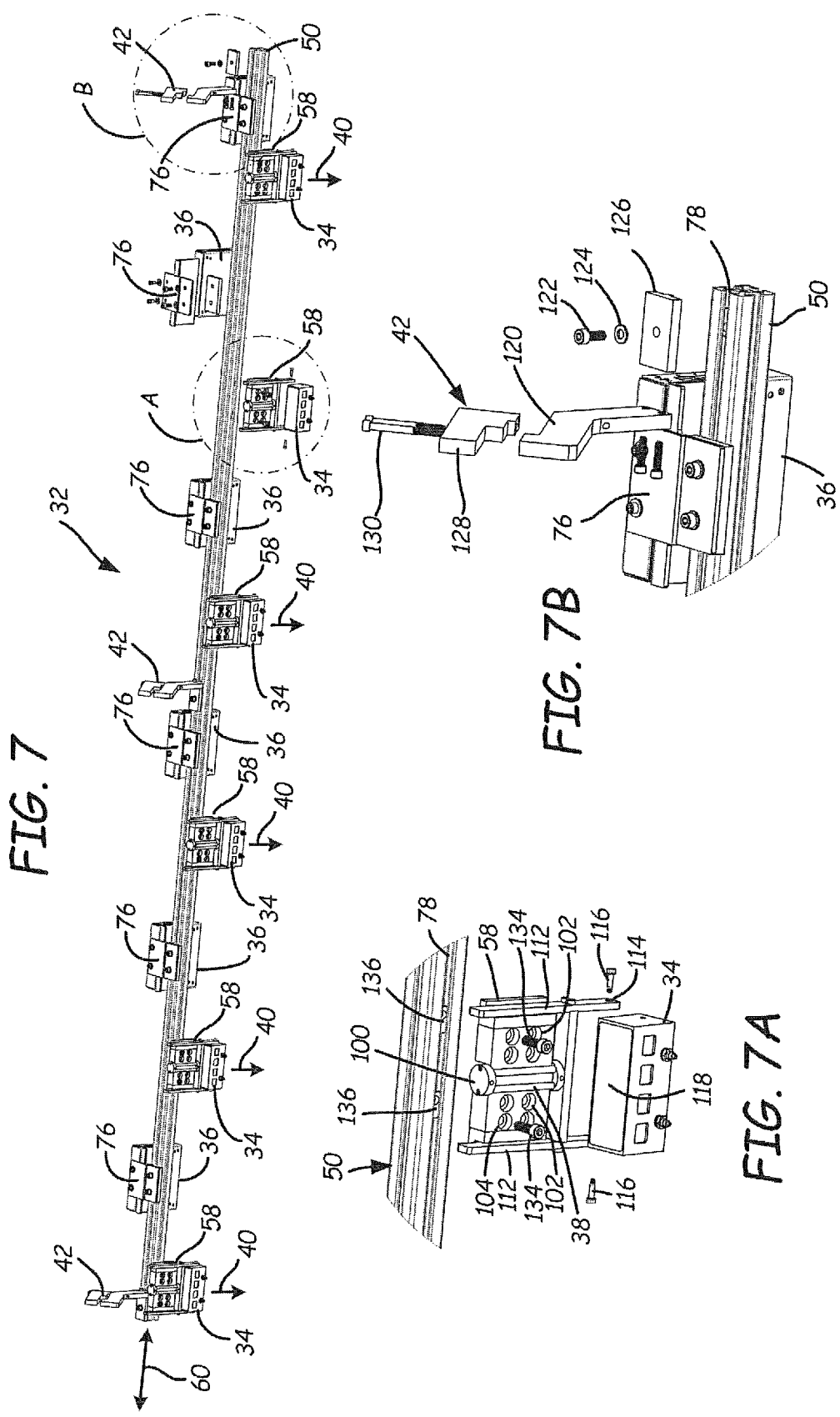

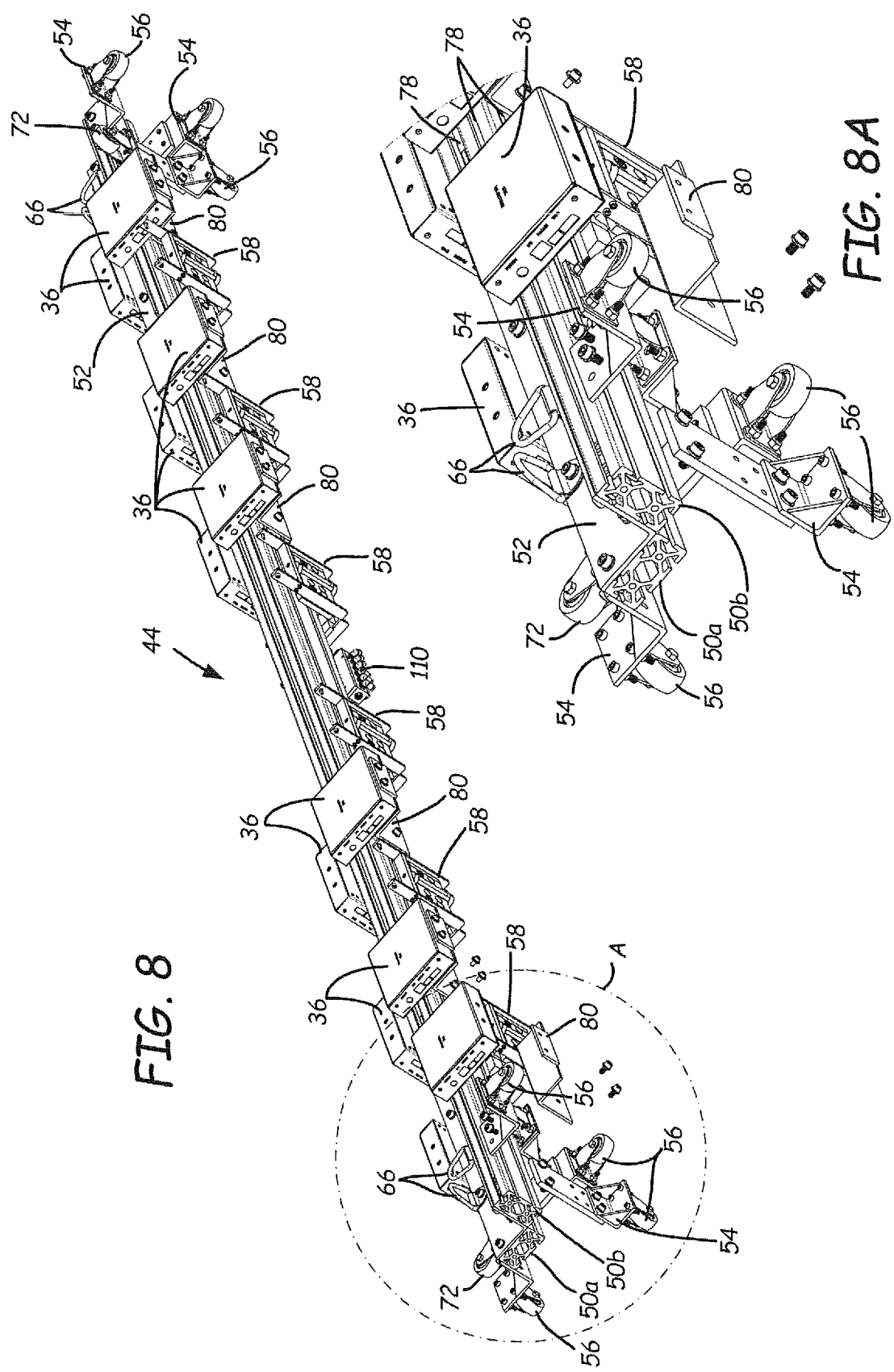

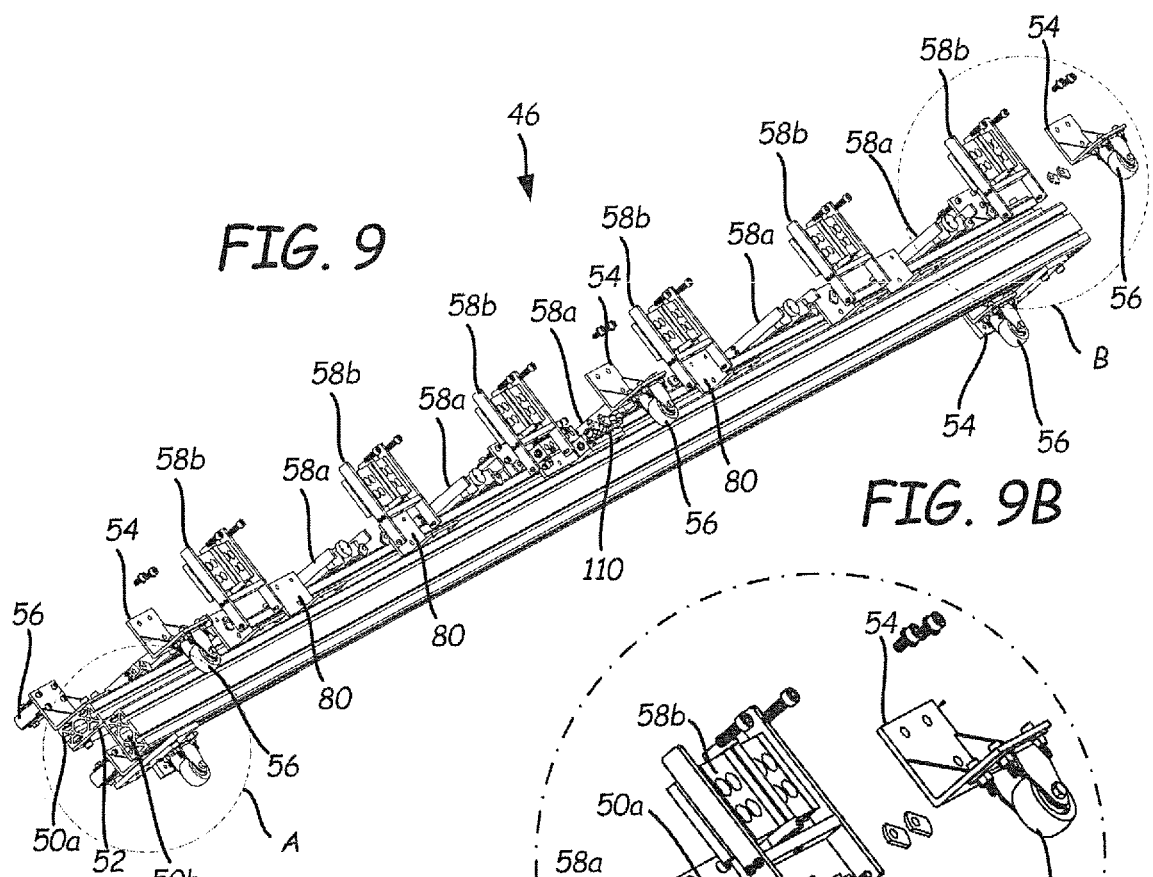
FIG. 9
FIG. 9B
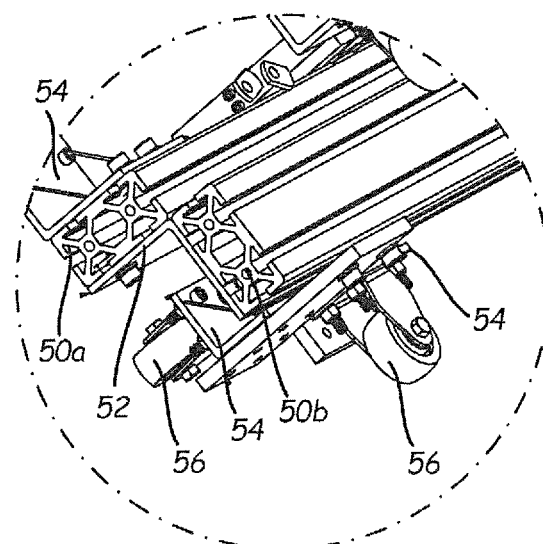
FIG. 9A

SENSOR MOUNTING SYSTEM

CROSS REFERENCE TO RELATED APPLICATION

This application is a division of U.S. patent application Ser. No. 16/190,303, filed Nov. 14, 2018, which claims the benefit of priority of U.S. Provisional Patent Application Ser. No. 62/585,671, filed Nov. 14, 2017; the contents of these priority applications are fully incorporated herein.

BACKGROUND

Pressure vessels are commonly used for containing a variety of gases or fluids under pressure, such as hydrogen, oxygen, natural gas, nitrogen, propane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may be formed of laminated layers of wound fiberglass filaments or other synthetic filaments bonded together by a thermo-setting or thermoplastic resin. A liner or bladder is often disposed within a pressure vessel shell to seal the vessel, thereby serving as a fluid permeation barrier.

Generally, pressure vessels have limited lifetimes, and it is desirable to remove a pressure vessel from service before it fails. Both cyclic fatigue and static fatigue (stress rupture) contribute to the fatigue load, and thus the failure, of pressure vessels. The calendar life of a pressure vessel, or the number of fatigue cycles over a specific pressure range (for example, from near empty to full), is commonly used to determine when to remove a vessel from service. However, in some applications, the pressure ranges and number of cycles applied to the pressure vessel are inconsistent and/or unknown. In addition, the interaction between cyclic fatigue life and static fatigue life is not fully understood. The effects of cycling combine in unknown ways with the effects of the duration the pressure vessel spends at full pressure.

Mathematical projections of vessel lifetime are commonly used to evaluate the fatigue life of a pressure vessel. This requires that the number of cycles be counted or estimated, then sorted by mean stress levels and stress range. These cycles are combined into an equivalent number of full-range cycles to estimate the remaining vessel life. It must then be determined how to combine this information with static fatigue. Uncertainties are inherent in the calculation and estimation of cycles, in combining cycle effects, and in assessing the projected total and remaining life of the pressure vessel.

Another way to assess the estimated useful life remaining in a pressure vessel is to use sensors to gather information on the pressure vessel's physical characteristics. Suitable sensors include Modal Acoustic Emission (MAE) sensors, for example. Such ultrasonic sensors are available from Digital Wave Corporation of Centennial, Colo. Ultrasonic wave propagation can be evaluated in bulk and "thin-walled" solid materials to assess the structural integrity of the materials. Due to the variation in stiffness as a function of propagation angle (i.e., material anisotropy), which is commonly observed in composite materials, significant effects in wave propagation characteristics are observed. Thus, such material anisotropy must be accounted for in the wave form analysis. Laminates further complicate this analysis because of the multiple material interfaces that should be considered. Analysis of such wave forms can lead to information regarding fiber fracture, matrix cracking, and interfacial delamination, for example.

SUMMARY

In one aspect, this disclosure describes a sensor mounting assembly configured for use with a vessel arrangement including at least first, second, third and fourth vessels. The sensor mounting assembly includes first and second elongated frame members, first and second rollers, and first and second sensors. The first roller is attached to the first elongated frame member and is configured to contact and roll upon a first surface of one of the first, second, third and fourth vessels. The first sensor is attached to the first elongated frame member and is configured to contact the surface of the first vessel upon actuation in a first direction. The second elongated frame member is connected to the first elongated frame member. The second roller is attached to the second elongated frame member and is configured to contact and roll upon a second surface of one of the first, second, third and fourth vessels. The second sensor is attached to the second elongated frame member and is configured to contact the surface of the second vessel upon actuation in a second direction that is substantially orthogonal to the first direction.

In another aspect, this disclosure describes another embodiment of a sensor mounting assembly configured for use with a vessel arrangement including at least first, second, third and fourth vessels. The vessel arrangement is disposed in a container in a two-by-two stacked configuration having a central space. The sensor mounting assembly includes a top rail assembly, an upper interior rail assembly, a lower interior rail assembly, and a bottom rail assembly. The top rail assembly is attached to the container proximate a top of the container and is configured to position a first sensor proximate the first vessel. The upper interior rail assembly is positioned in the central space and is configured to position a second sensor proximate the first vessel and a third sensor proximate the second vessel. The lower interior rail assembly is positioned in the central space and is configured to position a fourth sensor proximate the third vessel and a fifth sensor proximate the fourth vessel. The bottom rail assembly is attached to the container proximate a bottom of the container and is configured to position a sixth sensor proximate the fourth vessel.

In yet another aspect, this disclosure describes a method of mounting first, second, third, fourth, fifth, and sixths sensors for use with a vessel arrangement including at least first, second, third and fourth vessels, the vessel arrangement disposed in a container in a two-by-two stacked configuration having a central space. The method includes attaching a top rail assembly to the container proximate a top of the container to position a first sensor proximate the first vessel; inserting an upper interior rail assembly into the central space to position a second sensor proximate the first vessel and a third sensor proximate the second vessel; inserting a lower interior rail assembly into the central space to position a fourth sensor proximate the third vessel and a fifth sensor proximate the fourth vessel; and attaching a bottom rail assembly to the container proximate a bottom of the container to position a sixth sensor proximate the fourth vessel.

This disclosure, in its various combinations, may also be characterized by the following listing of items:

1. A sensor mounting assembly configured for use with a vessel arrangement including at least first, second, third and fourth vessels, the sensor mounting assembly including:
   a first elongated frame member;
   a first roller attached to the first elongated frame member, the first roller configured to contact and roll upon a first surface of one of the first, second, third and fourth vessels;
   a first sensor attached to the first elongated frame member and configured to contact the surface of the first vessel upon actuation in a first direction;
   a second elongated frame member connected to the first elongated frame member;
   a second roller attached to the second elongated frame member, the second roller configured to contact and roll upon a second surface of one of the first, second, third and fourth vessels; and
   a second sensor attached to the second elongated frame member and configured to contact the surface of the second vessel upon actuation in a second direction that is substantially orthogonal to the first direction.
2. The sensor mounting assembly of item 1 wherein the first roller and second roller are oriented substantially orthogonal to each other.
3. The sensor mounting assembly of any one of items 1-2 including a right angle plate that connects the second elongated frame member to the first elongated frame member in a mutually orthogonal arrangement.
4. The sensor mounting assembly of any one of items 1-3 including a third roller attached to the first elongated frame member, the third roller configured to contact and roll upon a third surface of one of the first, second, third and fourth vessels.
5. The sensor mounting assembly of item 4, wherein the third roller is oriented substantially parallel to one of the first roller and second roller.
6. The sensor mounting assembly of any one of items 4-5, including a raising mechanism that lifts the third roller to the third surface.
7. A sensor mounting assembly configured for use with a vessel arrangement including at least first, second, third and fourth vessels, the vessel arrangement disposed in a container in a two-by-two stacked configuration having a central space, the sensor mounting assembly including:
   a top rail assembly attached to the container proximate a top of the container and configured to position a first sensor proximate the first vessel;
   an upper interior rail assembly positioned in the central space and configured to position a second sensor proximate the first vessel and a third sensor proximate the second vessel;
   a lower interior rail assembly positioned in the central space and configured to position a fourth sensor proximate the third vessel and a fifth sensor proximate the fourth vessel; and
   a bottom rail assembly attached to the container proximate a bottom of the container and configured to position a sixth sensor proximate the fourth vessel.
8. The sensor mounting assembly of item 7, including a bracket configured to attach the top rail assembly to a sill of the container.
9. The sensor mounting assembly of any one of items 7-8, including a cross bar attached to the first and second vessels.
10. The sensor mounting assembly of item 9, including a raising mechanism attached to the cross bar and configured to position the upper interior rail assembly in the central space above the lower interior rail assembly.
11. The sensor mounting assembly of any one of items 7-10, wherein at least one of the upper interior rail assembly and lower interior rail assembly includes first and second rollers configured to contact and roll upon the third and fourth vessels, respectively.
12. The sensor mounting assembly of item 11, wherein the first and second rollers are oriented substantially orthogonal to each other.
13. The sensor mounting assembly of any one of items 11-12, wherein the at least one of the upper interior rail assembly and lower interior rail assembly includes a third roller configured to contact and roll upon one of the first and second vessels.
14. The sensor mounting assembly of item 13, wherein the third roller is oriented substantially parallel to one of the first roller and second roller.
15. The sensor mounting assembly of any one of items 7-14, including a bracket configured to attach the bottom rail assembly to a pipe of the container.
16. The sensor mounting assembly of any one of items 7-15, including a sensor bracket configured to roll on a frame of the bottom rail assembly and attach to the sixth sensor.
17. A method of mounting first, second, third, fourth, fifth, and sixths sensors for use with a vessel arrangement including at least first, second, third and fourth vessels, the vessel arrangement disposed in a container in a two-by-two stacked configuration having a central space, the method including:
   attaching a top rail assembly to the container proximate a top of the container to position a first sensor proximate the first vessel;
   inserting an upper interior rail assembly into the central space to position a second sensor proximate the first vessel and a third sensor proximate the second vessel;
   inserting a lower interior rail assembly into the central space to position a fourth sensor proximate the third vessel and a fifth sensor proximate the fourth vessel; and
   attaching a bottom rail assembly to the container proximate a bottom of the container to position a sixth sensor proximate the fourth vessel.
18. The method of item 17, including attaching a bracket of the top rail assembly to a sill of the container.
19. The method of any one of items 17-18, including raising the upper interior rail assembly in the central space to position the upper interior rail assembly above the lower interior rail assembly.
20. The method of any one of items 17-19, wherein positioning the sixth sensor includes rolling a sensor bracket on a frame of the bottom rail assembly.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 7 is a side perspective view of an exemplary top rail assembly.

FIG. 7A is an enlarged exploded view of the encircled portion in FIG. 7 labeled "A."

FIG. 7B is an enlarged exploded view of the portion of FIG. 7 that is encircled and labeled "B."

FIG. 8 is a perspective view of an exemplary upper interior rail assembly.

FIG. 8A is an enlarged view of the encircled portion "A" of FIG. 8.

FIG. 9 is a perspective view of an exemplary lower interior rail assembly.

FIG. 9A is an enlarged view of the encircled area "A" of FIG. 9.

FIG. 9B is an enlarged view of the encircled portion "B" of FIG. 9.

Figure 1:
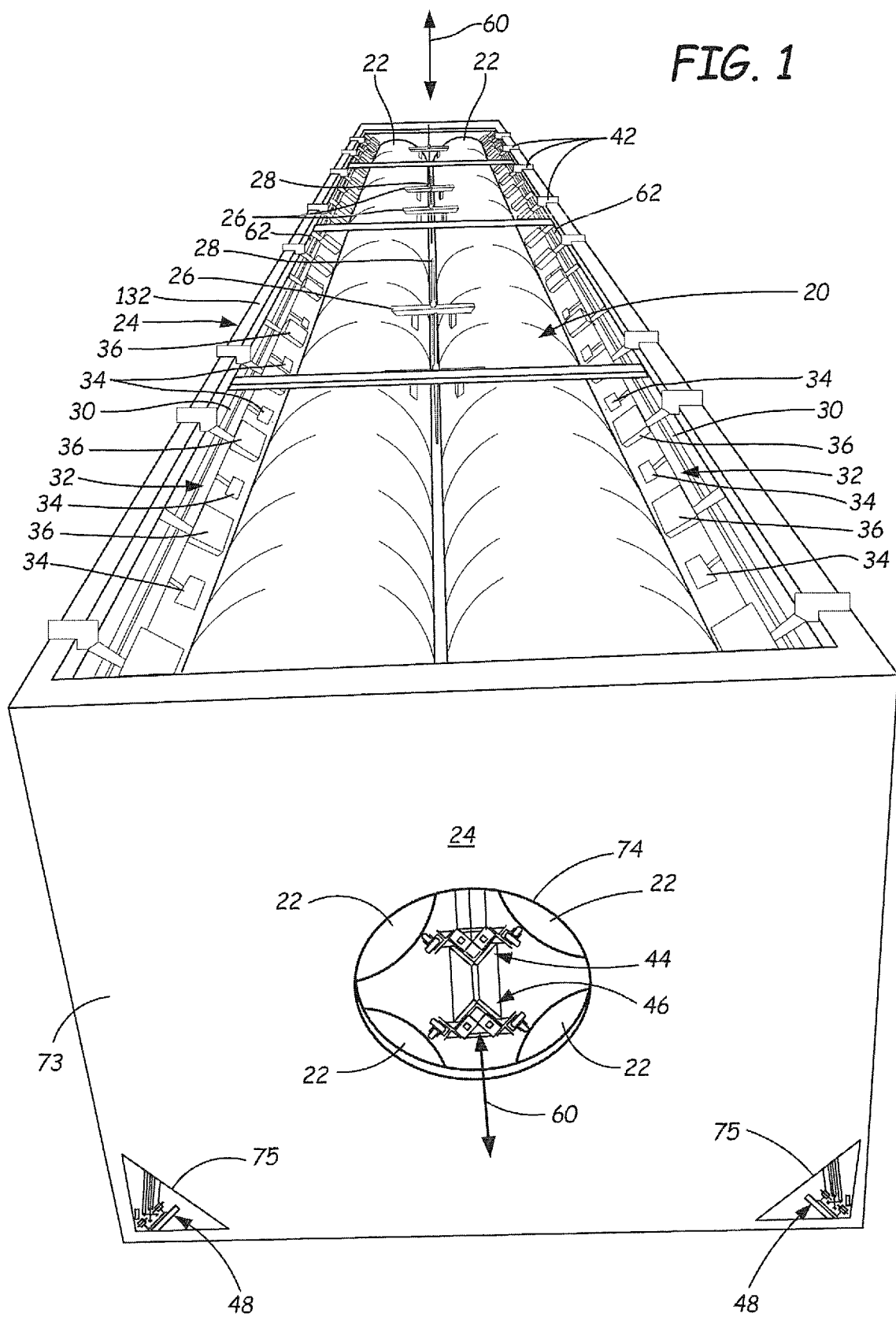
FIG. 1 is a top and end perspective view of a pressure vessel assembly positioned in a container, and having sensors positioned thereon using an exemplary embodiment of a sensor mounting system.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, end, right, left, vertical, horizontal, etc., are used, it is to be understood that they are used only for ease of understanding the description. It is contemplated that structures may be oriented otherwise.

DETAILED DESCRIPTION

As a result of the principal stress state and anisotropic construction of Type III and Type IV cylindrical composite pressure vessels (also called pressure cylinders), several unique wave propagation characteristics are observed by MAE sensors. These principal stress states are caused, for example, by the metallic load sharing liner on the interior of Type III cylinders and the inherently asymmetric laminate construction of Type IV composite pressure cylinders. From a laminated plate theory perspective, the non-symmetric laminate results in non-zero components of the coupling stiffness matrix ($B_{ij}$); from a wave propagation perspective, such a result indicates that unlike isotropic plates, pure extensional and flexure mode deformation will not be observed.

A key component to optimizing the sensor spacing for the MAE testing of composite pressure cylinders and ensuring full coverage of the cylinder is understanding the attenuation behavior of the composite laminate as a function of the propagation angle and the frequency at which the wave propagates. From experimental measurements and considerations of the principal stress state of the vessel, for an equivalent frequency, waves are attenuated more severely at angles approaching the axial direction of the vessel. Conversely, waves are attenuated less severely in the hoop direction, a fact that can be exploited when determining sensor spacing and placement schemes of composite pressure cylinders.

To minimize the number of sensor locations necessary to fully cover a vessel, increases in signal sensitivity and SNR (signal-to-noise ratio) can be realized through a Phased Array Modal Acoustic Emission (PA-MAE™) approach over traditional single-element MAE measurements. The increase in system sensitivity and SNR provided with PA-MAE™ are utilized in determining sensor spacing in highly attenuative wave propagation measurements, as is common in composite pressure cylinders. Furthermore, it has been shown that accurate source location from a multiple element array is possible.

In light of the above discussion, sensor array placement that is adequately dense in the axial direction 60, but which simultaneously takes advantage of the less attenuative nature of wave propagation in the hoop direction, is utilized to minimize the number of sensor placement locations, while fully covering the pressure vessel.

Sensor arrays have been used to assess the structural integrity of pressure vessels in laboratory settings. In the current state of the art, the pressure vessel is removed from its field application and shipped to a laboratory for testing. Thus, pressure vessels are typically not tested when they are deployed in arrangements in use. This disclosure is directed to a sensor mounting system that allows for the testing of pressure vessels in the field, such as in an arrangement 20 of four pressure vessels 22 contained within a container 24, as shown in FIG. 1. The disclosed system allows for requalification testing of the pressure vessels 22 out in the field by allowing testing sensors to be manipulated in very compact spaces around the pressure vessels as they are arranged in an actual use, such as in a shipping container, for example.

Figure 5:
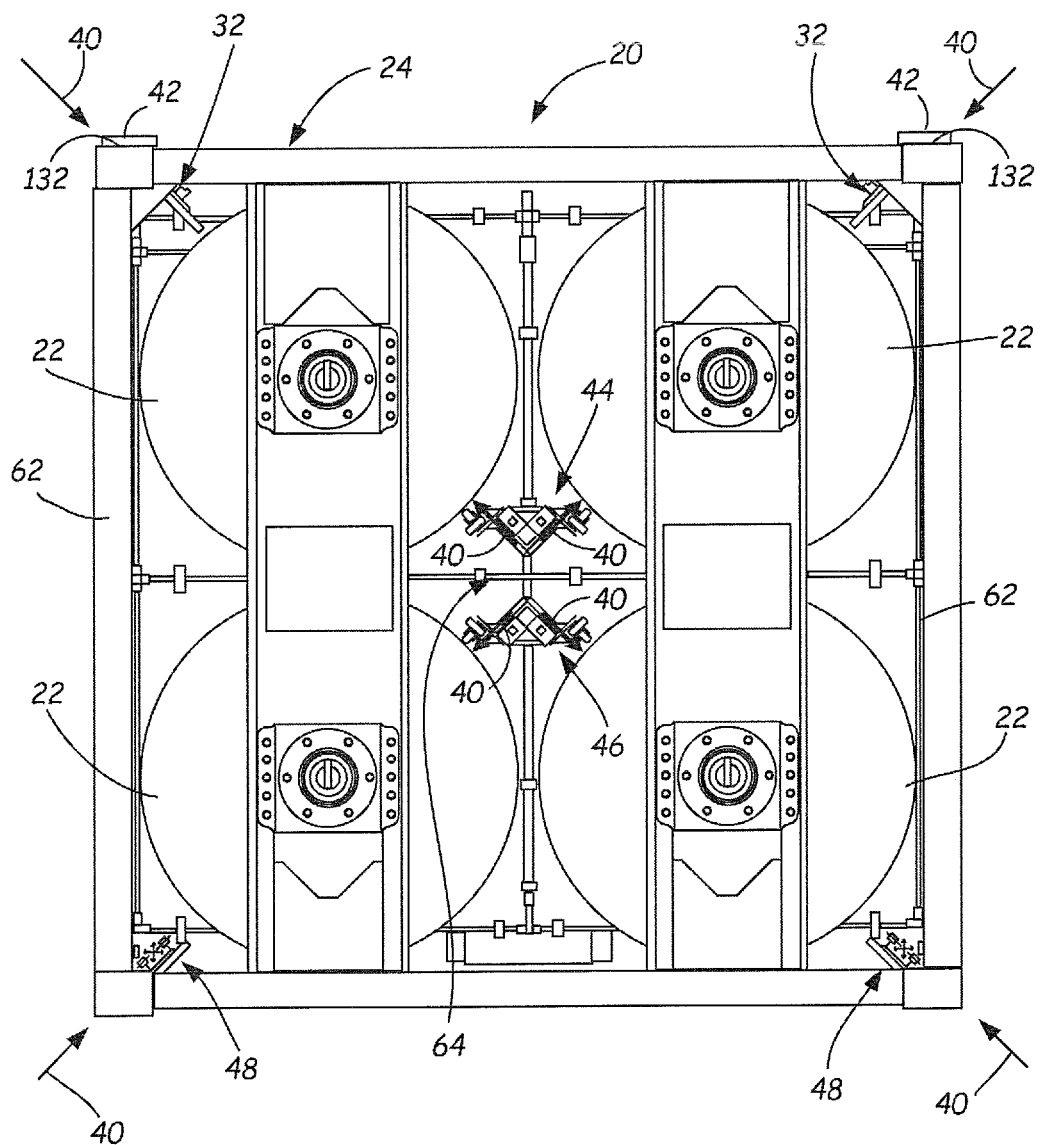
FIG. 5 is an end view of a pressure vessel assembly in a container, with an end wall panel of the container removed so that the pressure vessels and sensor mounting rail assemblies can be seen therein.

In an exemplary embodiment, container 24 is a typical intermodal shipping container, such as one suitable for use with semi-trailer trucks, trains, cargo ships and barges. FIG. 1 shows the top portion of an arrangement 20, the totality of which can be seen in FIG. 5. In FIG. 1, the roof of the container 24 has been removed to allow access to a top portion of arrangement 20 of the pressure vessels 22.

Figure 3:
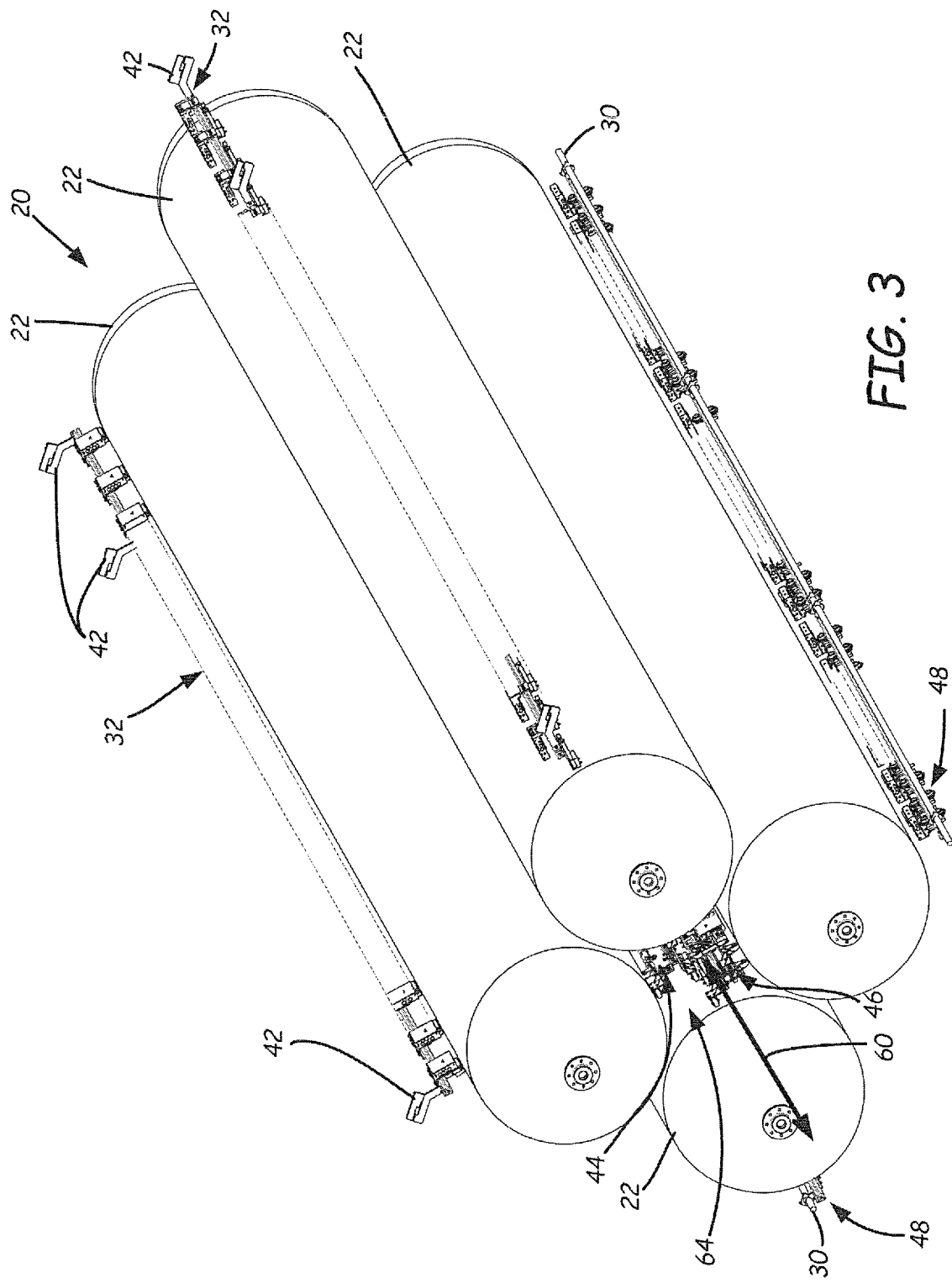
FIG. 3 is a side perspective view of the pressure vessel assembly and mounting rail assemblies of the sensor mounting system, without the container.
Figure 6:
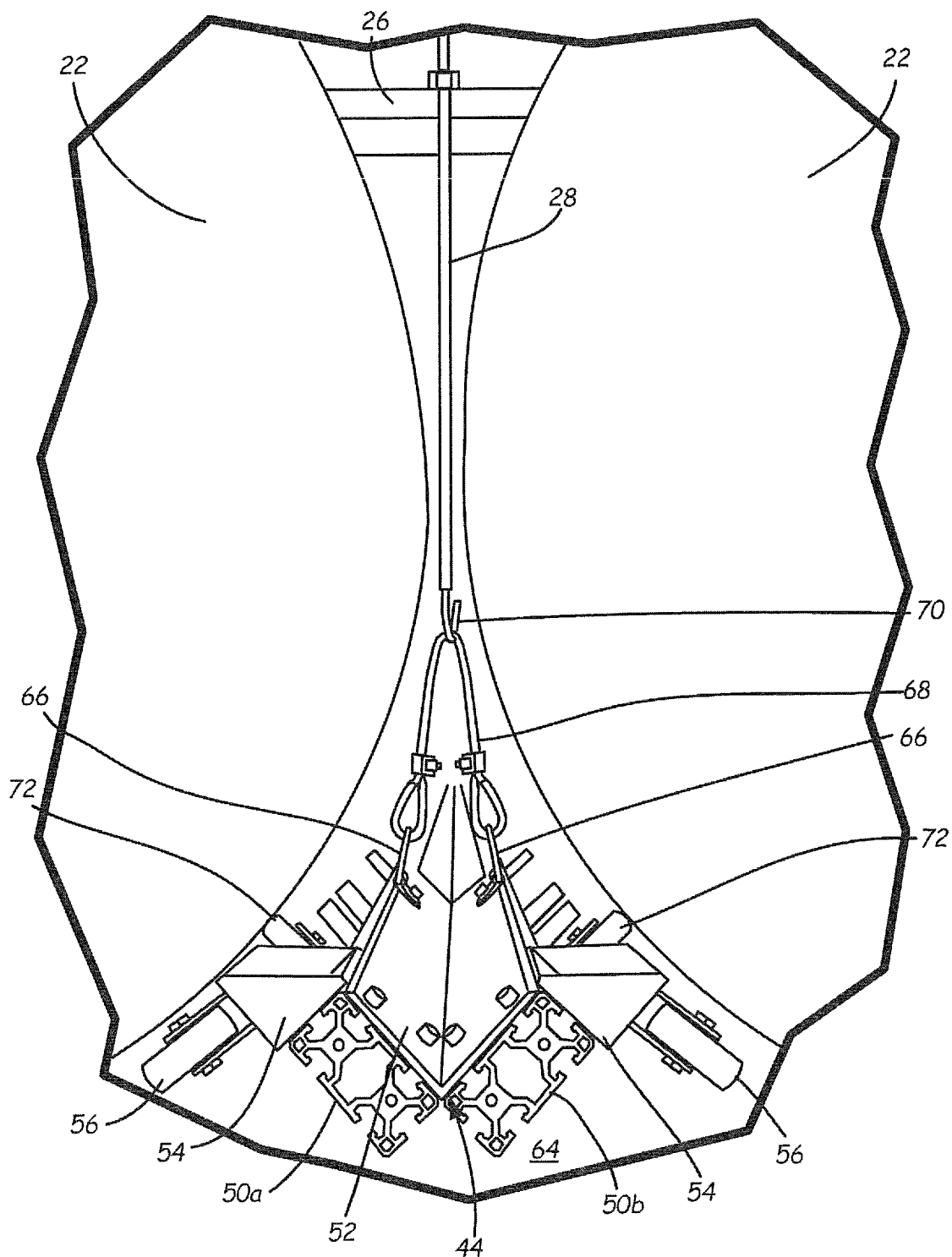
FIG. 6 is a close-up end perspective view of a portion of FIG. 5.
Figure 10:
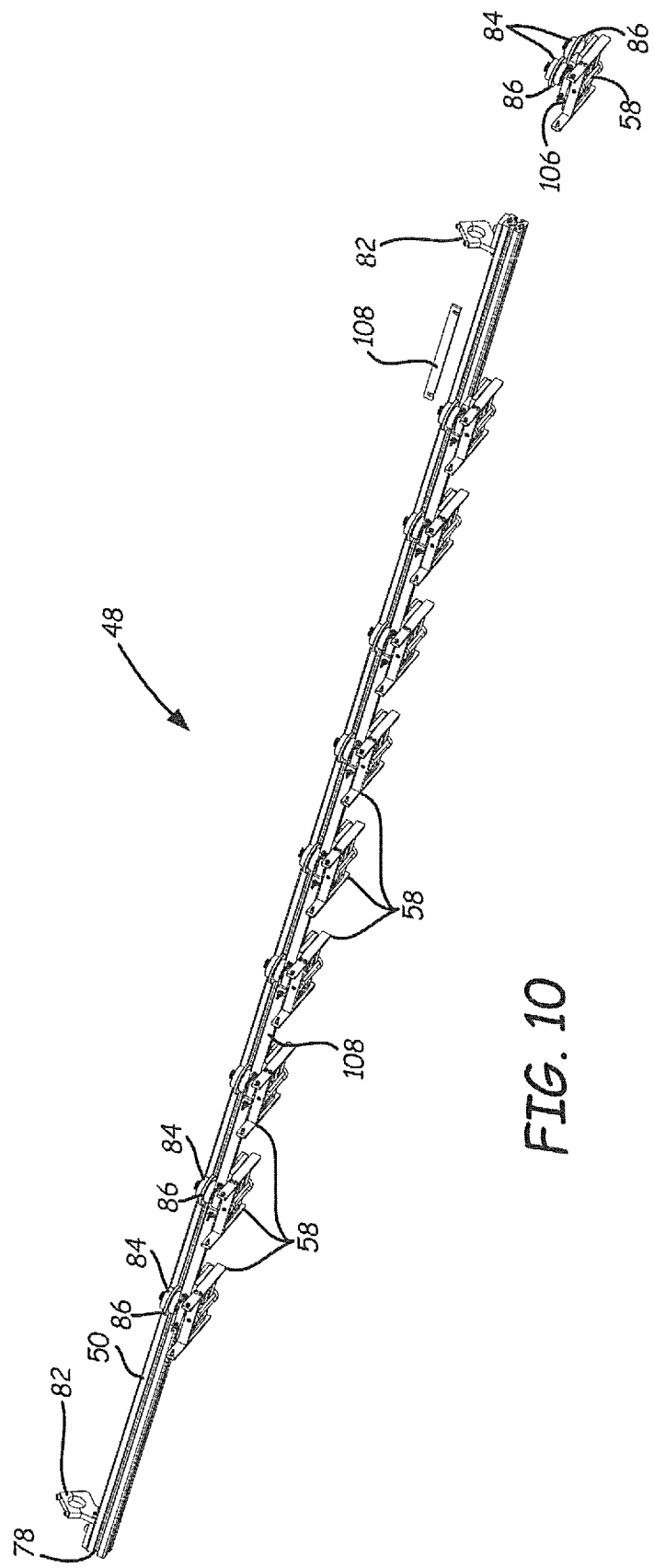
FIG. 10 is a perspective view of an exemplary bottom rail assembly.
Figure 14:
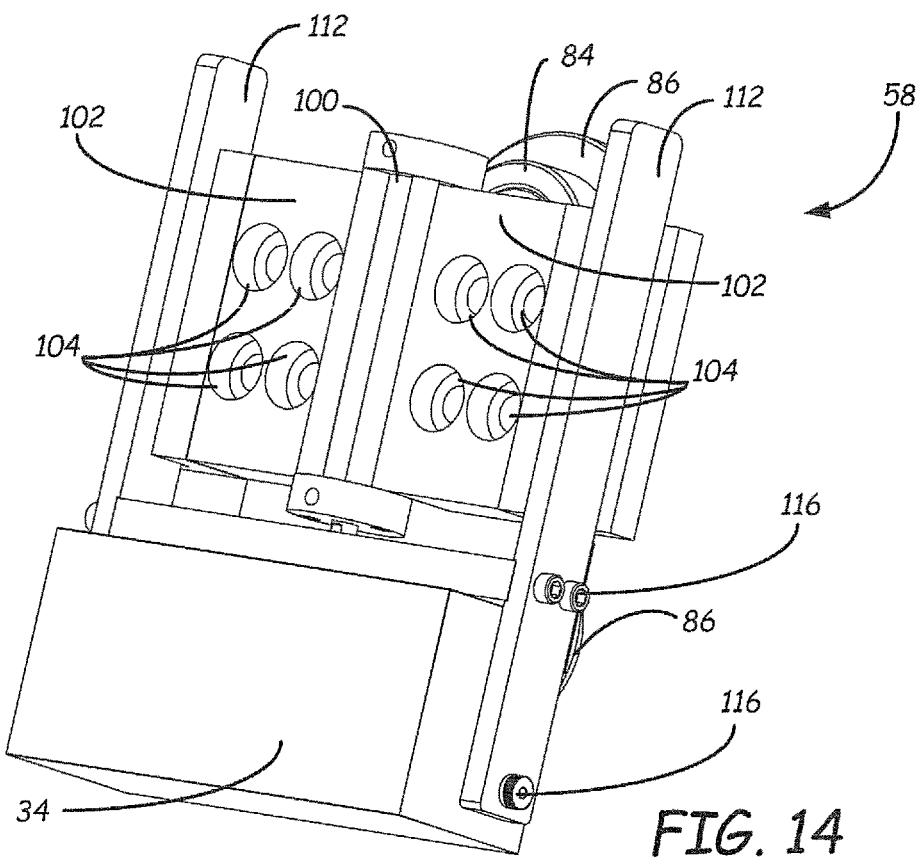
FIG. 14 is a front perspective view of an exemplary sensor bracket having an attached sensor and roller plate.
Figure 15:
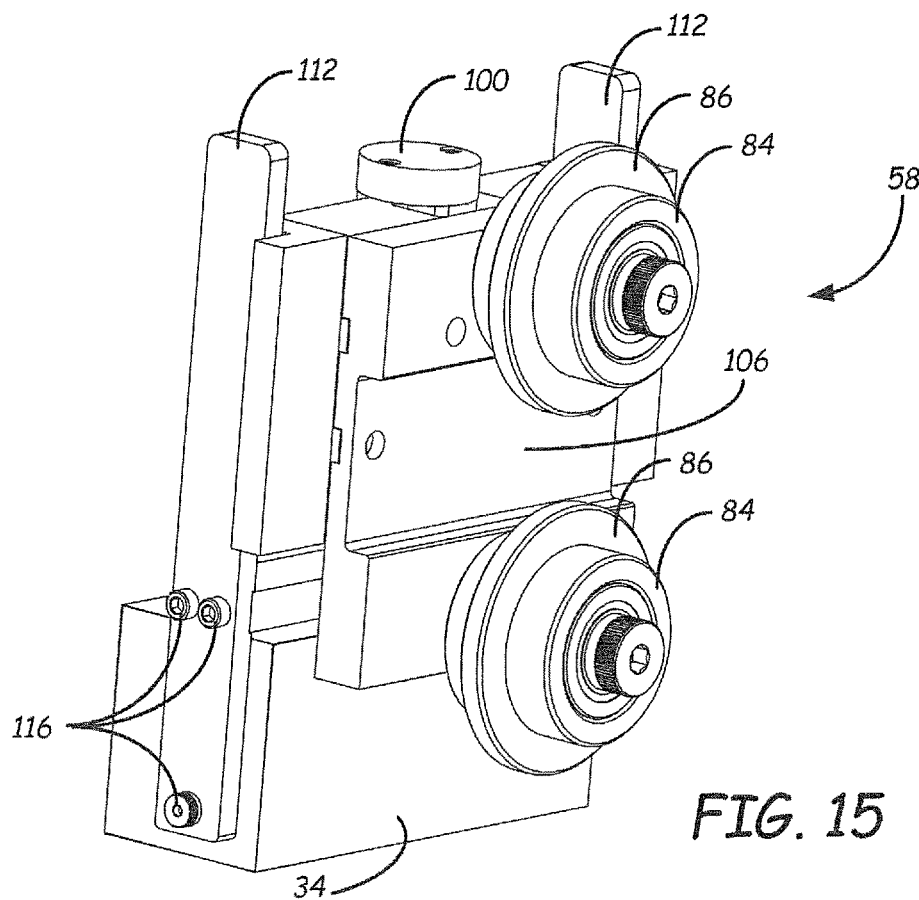
FIG. 15 is a rear perspective view of the exemplary sensor bracket assembly of FIG. 14.

As shown in FIGS. 1 and 3, different types of rail assemblies for holding the sensors are used in different areas of the container 24. Rail assemblies 32, 44, 46 and 48 allow for insertion of the sensor arrays into the confined areas within the shipping container 24 and around the pressure vessels 22. For example, top rail assembly 32 includes brackets 42 for resting upon a side wall 62 of a shipping container 24 in which the arrangement 20 of pressure vessels 22 is placed. Upper interior rail assembly 44 includes wheels thereon for rolling into the space 64 between the pressure vessels 22, with the rollers or casters 56 rolling upon the upper wall surfaces of the two bottom pressure vessels 22. Once rolled into the space 64, the upper interior rail assembly 44 is raised into position against the upper two pressure vessels 22 by cable 68 and hook 70, as shown in FIG. 6. Thereafter, the lower interior rail assembly 46 can be similarly rolled into space 64. Two bottom rail assemblies 48 are attached by pipe brackets 82 to pipes 30 at the lower corners of container 24. Thereafter, sensor brackets 58 (having spacer bars 108 attached between adjacent sensor brackets 58) are rolled onto frame member 50 of bottom rail assembly 48 via rollers 84, as shown in FIGS. 10, 14 and 15.

Figure 2:
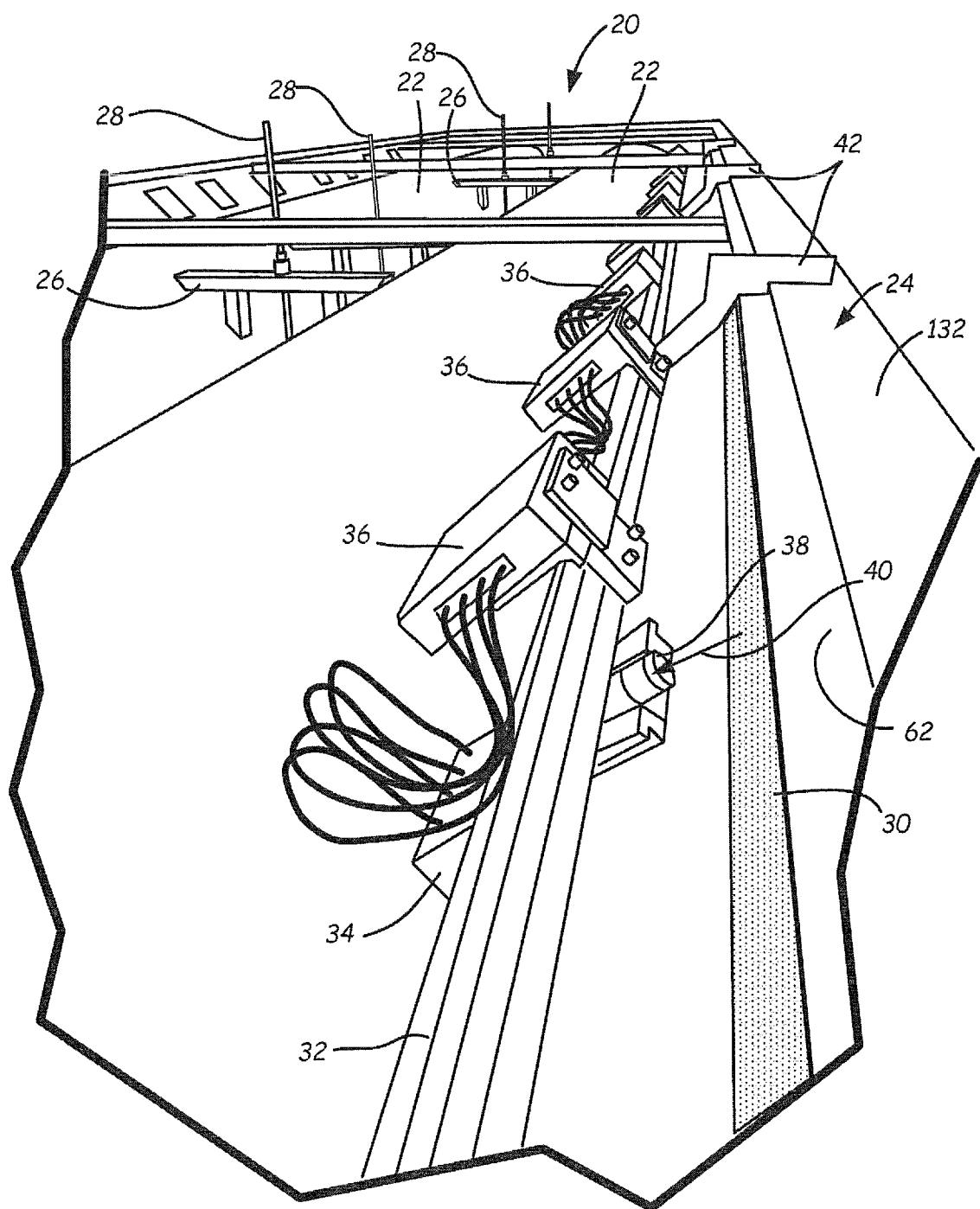
FIG. 2 is a close-up view of a portion of FIG. 1, showing a sensor and data acquisition box mounted relative to a pressure vessel.

As shown in FIGS. 1 and 2, in an exemplary embodiment, cross bars 26 span across the top two pressure vessels 22 and include support rods 28. In container 24, a perforated pipe 30 may span a length (i.e., dimension along axial direction 60) of the container 24 at the top and/or bottom of each of the side walls 62 of container 24. In some cases, perforated pipes 30 contain fire protection elements. In an exemplary embodiment, top rail assemblies 32 of an exemplary sensor mounting system are positioned proximate top pipes 30. A plurality of sensors 34 and associated data acquisition boxes 36 are arranged along a length (i.e., dimension along axial direction 60) of each top rail assembly 32. In an exemplary embodiment, each sensor 34 is a PA-MAE sensor that is configured to be placed in contact with the outer cylindrical surface of pressure vessel 22. As shown in the illustrations, an array of the sensors 34 is positioned along the surfaces of pressure vessels 22 in predetermined locations to gather acoustic wave data relevant to each pressure vessel 22.

FIG. 2 is a close-up view of a right-hand portion of FIG. 1, showing a sensor 34 and its associated data acquisition box 36. To position sensor 34 to obtain information on pressure vessel 22, an actuation device 38 is actuated to move sensor 34 in direction 40, so that the sensing surface of sensor 34 contacts the outer surface of pressure vessel 22 with an appropriate coupling force. In exemplary embodiments, suitable actuation devices 38 include, for example, pneumatic cylinders, electric motors, and magnetic actuators. In an exemplary embodiment, direction 40 is substantially orthogonal to a tangent of the outer surface of pressure vessel 22. In an exemplary embodiment, top rail assembly 32 is supported on container 24 by brackets 42.

In FIGS. 1 and 2, only the upper portion of an arrangement 20 of four pressure vessels 22 is visible. FIG. 3 show the entire arrangement 20 of four pressure vessels 22, removed from container 24. While the disclosed mounting system is described with reference to a set of four pressure vessels 22, positioned in a two-by-two stacked arrangement, it is contemplated that the various components of the disclosed mounting system can be applied to other arrangements of pressure vessels including more or fewer pressure vessels, in different stacked configurations, and/or different vessel sizes. As shown in FIG. 3, an exemplary sensor mounting system includes two top rail assemblies 32, an upper interior rail assembly 44, a lower interior rail assembly 46, and two bottom rail assemblies 48. Each of these rail assemblies 32, 44, 46 and 48 has a length that is suitable for the pressure vessels 22 to be tested, and also configured for the container 24 in which the pressure vessel arrangement 20 is positioned. While sensors 34, data acquisition boxes 36, actuation devices 38, and their associated electrical, signal, and fluid supply lines are not shown in some drawings for ease of viewability, it is to be understood that they would be attached to the described sensor mounting system in actual use. In an exemplary embodiment, each of the rail assemblies 32, 44, 46, 48 carries the same number of sensors 34 and their corresponding actuation devices 38, evenly spaced along a length that is parallel to axial direction 60. In FIG. 3, for simplicity of illustration, not all of the devices 34, 36 are shown on each of the rail assemblies 32, 44, 46 and 48.

In the illustrated embodiments, each of the pressure vessels 22 has a row of sensors 34 (mounted on rail assemblies 32, 44, 46, 48) on diametrically opposed sides of the pressure vessel 22. Thus, in the illustrated embodiment, the rows of sensors 34 are arranged around each pressure vessel 22 with a radial spacing of about 180 degrees. Such an arrangement 20 is particularly suitable for use with phased array MAE sensors. However, it is contemplated that additional rows of sensors 34 (and corresponding rail assemblies) could be added, such as would be suitable with other types of sensors, such as the more traditional single-element MAE sensors, or as vessel diameter, material attenuation behavior, and other factors warrant. For example, additional rail assemblies may be used to space rows of sensors around each pressure vessel 22 with a radial spacing of about 90 degrees. Moreover, where a pressure vessel is removed from a container, additional flexibility is afforded, and a radial spacing between three rows of sensors around a pressure vessel with a radial spacing of about 120 degrees is useful. It is contemplated that still other radial spacings are suitable, such as might be used with other types of sensors.

Figure 4:
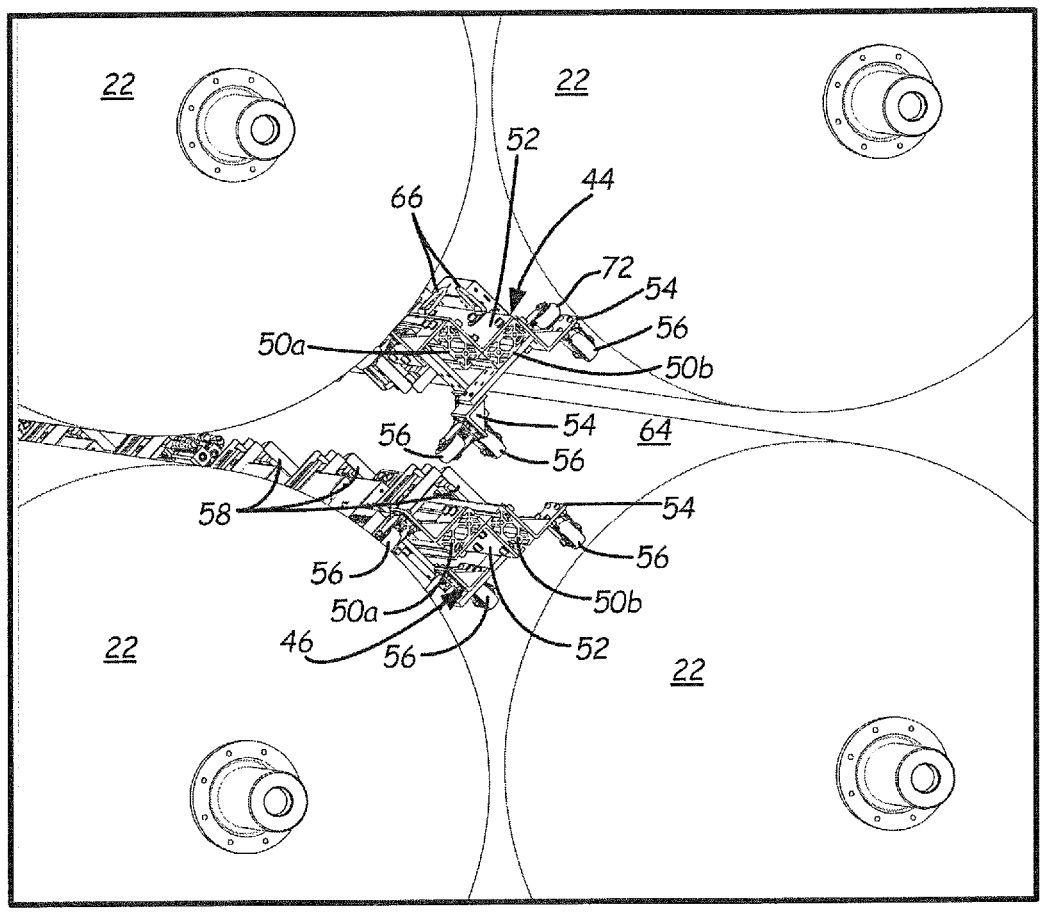
FIG. 4 is a close-up view of a portion of FIG. 3, taken from a different viewing angle.

As shown in FIG. 4, each of upper interior rail assembly 44 and lower interior rail assembly 46 includes two t-slot aluminum frame members 50 in an exemplary embodiment. Particularly suitable frame members 50 are commercially available from 80/20 Inc. of Columbia City, Ind. In an exemplary embodiment, the two frame members 50 of each of upper interior rail assembly 44 and lower interior rail assembly 46 are held in a mutually orthogonal relationship by the affixation of each of frame members 50 to an angle plate 52. Brackets 54 of each of interior rail assemblies 44, 46 carries casters 56 thereon. As shown on lower interior rail assembly 46, casters 56 are oriented to roll on the outer cylindrical surfaces of the lower pressure vessels 22. Sensor mounting brackets 58 are positioned on interior rail assemblies 44, 46 so that actuation devices 38 mounted thereon will move the attached sensors into position in contact with the outer cylindrical surfaces of the pressure vessels 22.

Because the interior rail assemblies 44, 46 each include two frame elements 50, the frame elements of the interior rail assemblies 45, 46 in some cases will be referred to with reference numerals 50a and 50b. However, it is to be understood that all references to frame member 50 will also apply to frame members 50*a* and 50*b*, unless otherwise indicated.

Upper interior rail assembly 44 has a plurality of casters 56 arranged similarly to those described with reference to lower interior rail assembly 46. To position the interior rail assemblies 44, 46 in the space 64 between the four pressure vessels 22, in an exemplary method of positioning rail assemblies of an exemplary sensor mounting system, the upper interior rail assembly 44 is inserted into space 64 while the lower interior rail assembly 46 remains outside of arrangement 20. Upper interior rail assembly 44 is inserted into space 64 proximate an end of the pressure vessels 22 by rolling the upper interior rail assembly 44 on casters 56 on the cylindrical surfaces of the two bottom pressure vessels 22. Thus, the upper interior rail assembly 44 would occupy essentially the position shown as being occupied by the lower interior rail assembly 46 in FIG. 4. After the upper interior rail assembly 44 is fully inserted into space 64, the upper interior rail assembly 44 is raised into the position shown in FIG. 4 by a cable inserted through loops 66, which are affixed to angle bracket 52 in an exemplary embodiment. As shown in FIG. 6, an exemplary cable 68 is attached to support rod 28, which in turn is attached to cross bar 26. In an exemplary embodiment, an easily detachable connection between support rod 28 and cable 68 is provided by hook 70. In the lifted position, another set of casters 72 is placed in contact with the cylindrical outer surfaces of the two upper pressure vessels 22.

After the upper interior rail assembly 44 is lifted into the position shown in FIGS. 4 and 6, the lower interior rail assembly 46 can be rolled into position as shown, with casters 56 contacting the cylindrical surfaces of the bottom two pressure vessels 22. As shown in FIG. 1, front wall panel 73 of container 24 has an opening 74 provided therein to allow for the insertion of interior rail assemblies 44, 46 into space 64 between the four pressure vessels 22 of arrangement 20. To position sensor 34 to obtain information on pressure vessel 22, an actuation device 38 is actuated to move sensor 34 in direction 40, so that the sensing surface of sensor 34 contacts the outer surface of pressure vessel 22 with an appropriate coupling force. In exemplary embodiments, suitable actuation devices 38 include, for example, pneumatic cylinders, electric motors, and magnetic actuators. In an exemplary embodiment, direction 40 is substantially orthogonal to a tangent of the outer surface of pressure vessel 22. While not illustrated, it is to be understood that a plurality of electrical power, signal communication, and pneumatic air lines are connected to the sensors 34, actuators 38 and associated data acquisition boxes 36 mounted on the rail assemblies 32, 44, 46, 48.

FIG. 7 is a perspective view of an exemplary embodiment of top rail assembly 32. FIG. 7A is an enlarged view of the portion of FIG. 7 that is encircled and labeled "A." FIG. 7B is an enlarged view of the portion of FIG. 7 that is encircled and labeled "B." In FIG. 7, some of the sensor brackets 58, container brackets 42, and data acquisition box brackets 76 shown attached to frame member 50. Additionally, one each of container bracket 42, sensor bracket 58 and data acquisition box bracket 76 are shown detached from frame member 50. A length of frame member 50 (along axial direction 60) can be selected to suit a particular pressure vessel 22 to be assessed. Moreover, the number of sensor brackets 58 and data acquisition box brackets 76 (and a corresponding number of sensors 34 and data acquisition boxes 36) can be selected according to the length and diameter of the pressure vessel 22, along with other considerations such as the pressure vessel material composition and the type of sensor 34 to be mounted. Each of the plurality of sensor mounts 58 is preferably evenly spaced along a length of frame member 50 (i.e., at equal intervals) in an exemplary embodiment. Such positioning along the length of frame member 50 can be adjusted in some embodiments by sliding and/or rolling the bracket 42, 58 or 76 along longitudinal slots 78 of frame member 50. Moreover, the brackets 42, 58, 76 can be attached to frame member 50 using fasteners such as plates, washers, screws, and bolts, for example.

Figure 7C:
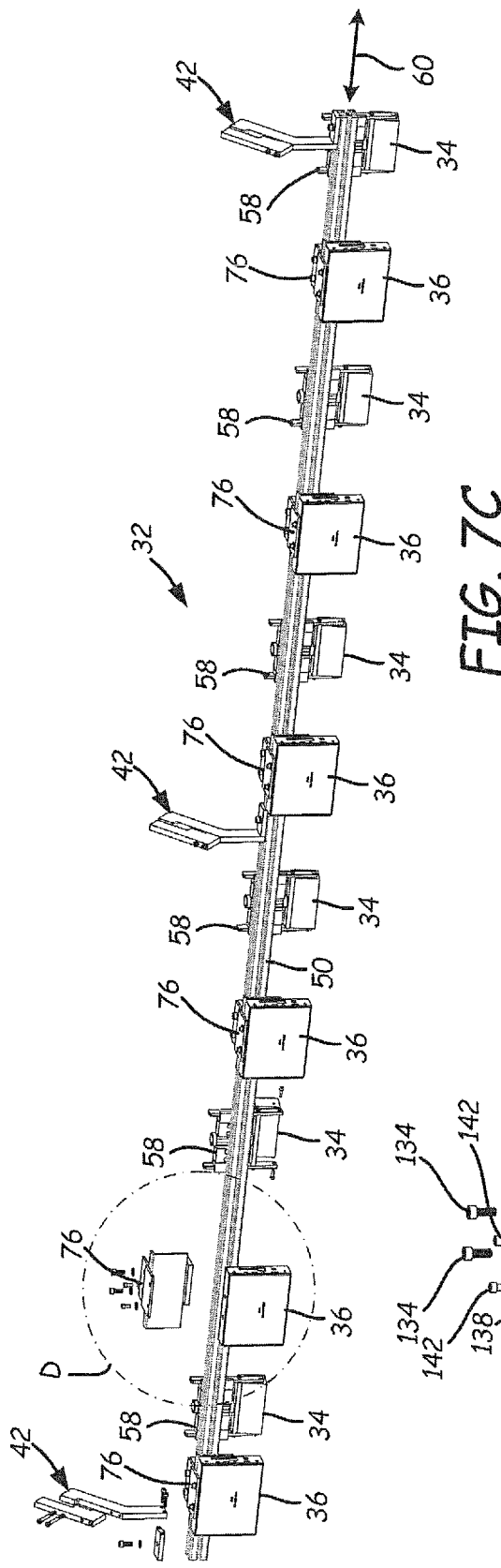
FIG. 7C shows a reverse side of the top rail assembly of FIG. 7.
Figure 7D:
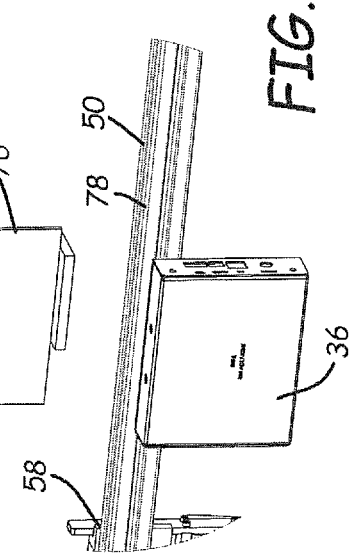
FIG. 7D is an enlarged exploded view of the portion of FIG. 7C that is encircled and labeled "D."

FIG. 7C shows a reverse side of the top rail assembly 32 of FIG. 7. FIG. 7D is an enlarged view of the portion of FIG. 7C that is encircled and labeled "D." As shown in FIGS. 7A, and 12-15, in an exemplary embodiment, sensor bracket 58 includes arms 112 on opposed sides of plates 102. Each arm 112 includes at least one hole 114 configured for the passage of fastener 116, which secures sensor 34 between arms 112 of sensor bracket 58. As shown in FIG. 7A, fasteners 134 pass through two of holes 104 in plates 102 and connect to corresponding fasteners 136 positioned within slot 78 of frame member 50. An actuation device 38 is held in actuator containment space 100 and is configured to push upon surface 118 of sensor 34 in direction 40. This action moves suitable sensor components into contact with the surface of pressure vessel 22.

As shown in FIGS. 7 and 7B, in an exemplary embodiment, container bracket 42 includes a first portion 120 attached to frame member 50 with fastener 122, washer 124, and plate 126. Container bracket 42 also includes a second portion 128 attached to the first portion 120 by fastener 130, to thereby clamp sill 132 of side wall 62 (labeled in FIGS. 1, 2 and 5) of container 24 between the first and second portions 120, 128 of container bracket 42.

As shown in FIG. 7D, in an exemplary embodiment, data acquisition box bracket 76 includes plate 138 having holes 140 for the passage of fasteners 142, which attach to data acquisition box 36. Further, plate 138 has holes 144 for the passage of fasteners 134, which connect to corresponding fasteners 136 positioned within slot 78 of frame member 50 (as discussed above with reference to FIG. 7A, for example).

Figure 13:
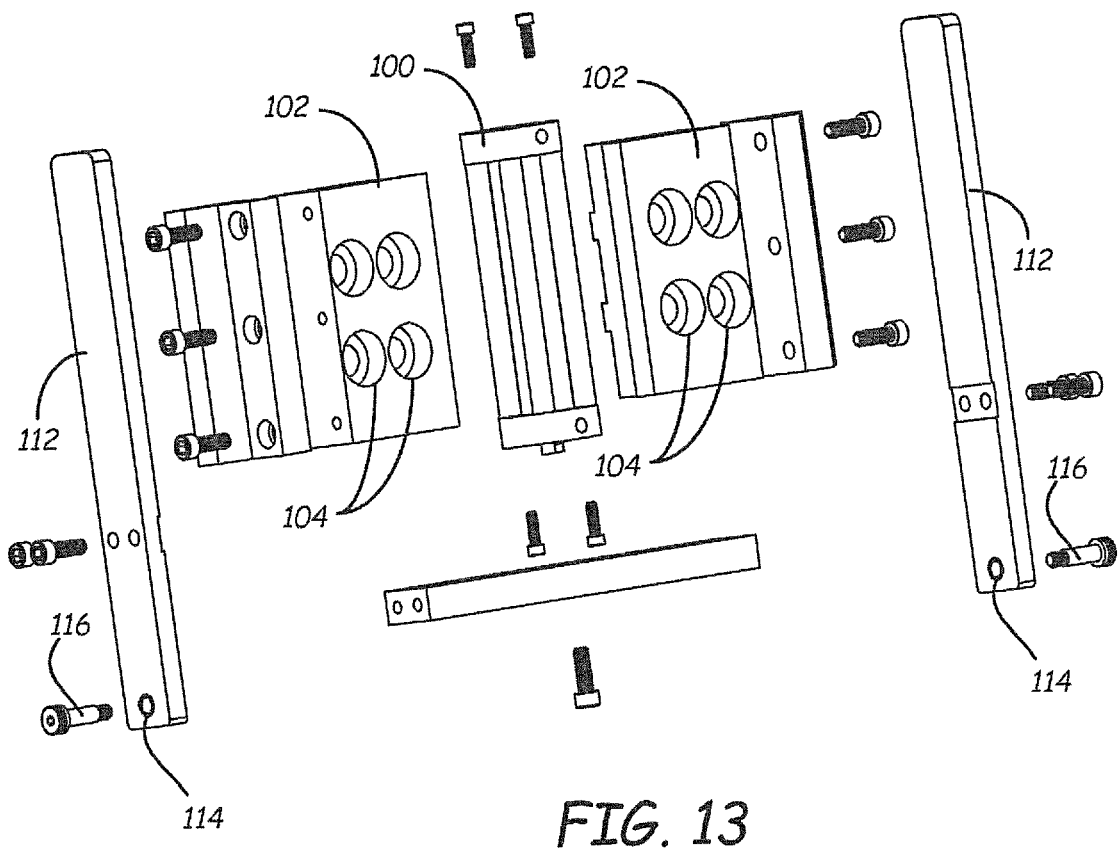
FIG. 13 is an exploded view of the sensor bracket of FIG. 12.

FIGS. 13-15 show perspective and exploded perspective views of exemplary embodiments of sensor bracket 58. An exemplary sensor bracket 58 includes a centrally located actuator containment space 100, configured to hold actuation device 38. Plates 102 includes holes 104 configured to accept fasteners for attachment to frame member 50, as discussed above with reference to FIG. 7A. Additionally, referring to FIGS. 14 and 15, holes 104 may be used to accept fasteners (not shown) for attachment of plate 106, which is in turn attached to rollers 84.

FIG. 8 is a perspective view of an exemplary embodiment of upper interior rail assembly 44. On the left side of FIG. 8, in encircled portion "A," some of the components such as caster bracket 54 and its associated caster 56, sensor bracket 58, data acquisition box bracket 80 and its associated data acquisition box 36 are shown as detached from frame members 50. However, these elements are illustrated as being attached to frame members 50 in the un-encircled portion of FIG. 8. In FIG. 8, the sensor brackets 58 and data acquisition box brackets 80 on only one of the frame elements 50*b* are clearly visible. However, it is to be understood that a similar arrangement of sensor brackets 58 and data acquisition box brackets 80 is also provided on the other frame element 50*a*. FIG. 8 also shows fluid manifold 110, to which fluid lines are attached for actuation of actuation devices 38 held in actuator containment space 100 of sensor bracket 58.

FIG. 9 is a perspective view illustrating some components of an exemplary lower interior rail assembly 46. Because the sensor brackets 58 are mounted on two frame members 50a and 50b, in some cases, the sensor brackets will be referred to with reference numerals 58a and 58b. However, it is to be understood that all references to sensor bracket 58 will also apply to sensor brackets 58a and 58b, unless otherwise indicated. Sensor brackets 58a are shown as attached to frame element 50a. Sensor brackets 58b are shown as removed from frame element 50b. In an exemplary embodiment, data acquisition box brackets 80 are attached to frame element 50 between adjacent sensor brackets 58.

FIG. 10 is a perspective view of an exemplary embodiment of bottom rail assembly 48, which includes pipe brackets 82 attached to frame element 50 proximate ends of the frame element 50. In an exemplary embodiment, sensor brackets 58 are attached to frame element 50 by rollers 84, shown in FIGS. 14 and 15. In an exemplary embodiment, each roller 84 is configured with a flange 86 that rolls along groove 78 of frame element 50. In an exemplary embodiment, spacer bars 108 are positioned on frame element 50 between adjacent sensor brackets 58 to facilitate accurate and consistent spacing intervals between adjacent sensor brackets 58 (and therefore consistent spacing between sensors 34 in the mounted sensor arrays).

Figure 11:
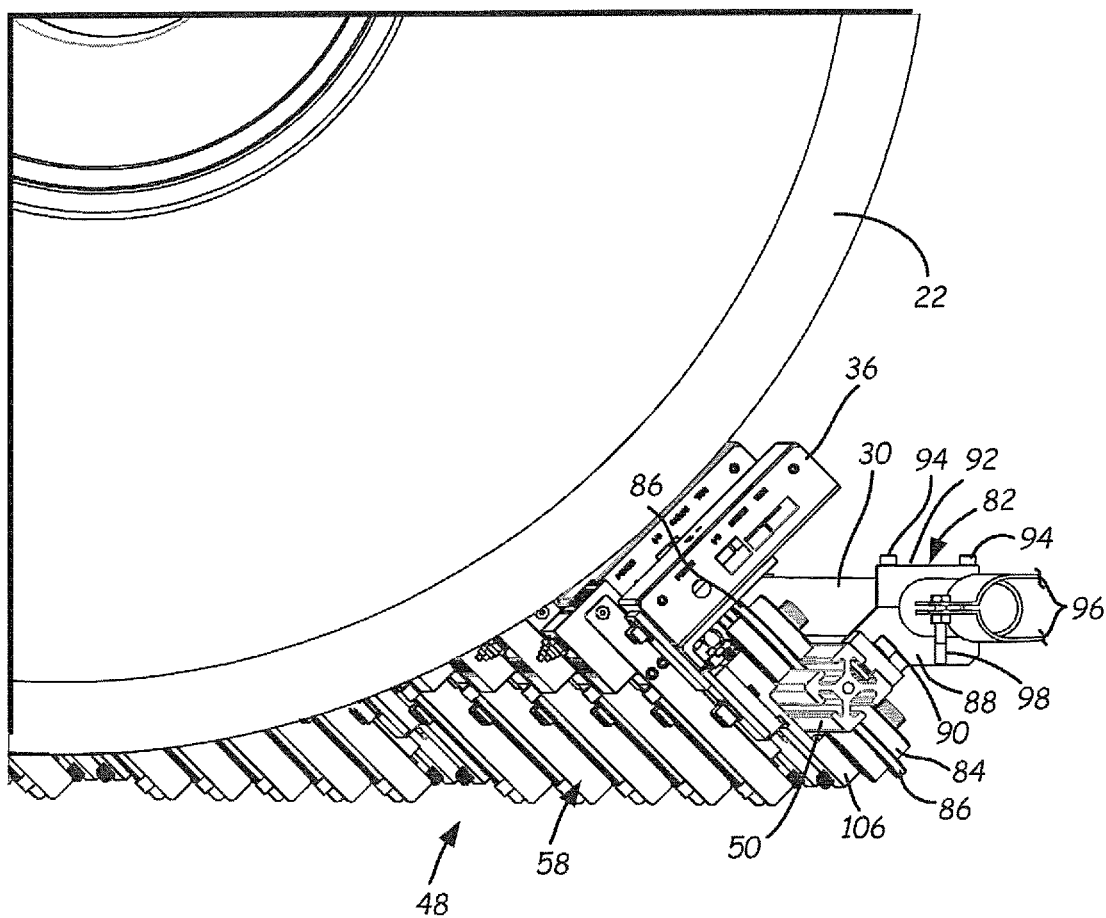
FIG. 11 is a partial view of a portion of the bottom rail assembly mounted to a pipe of the container.
Figure 12:
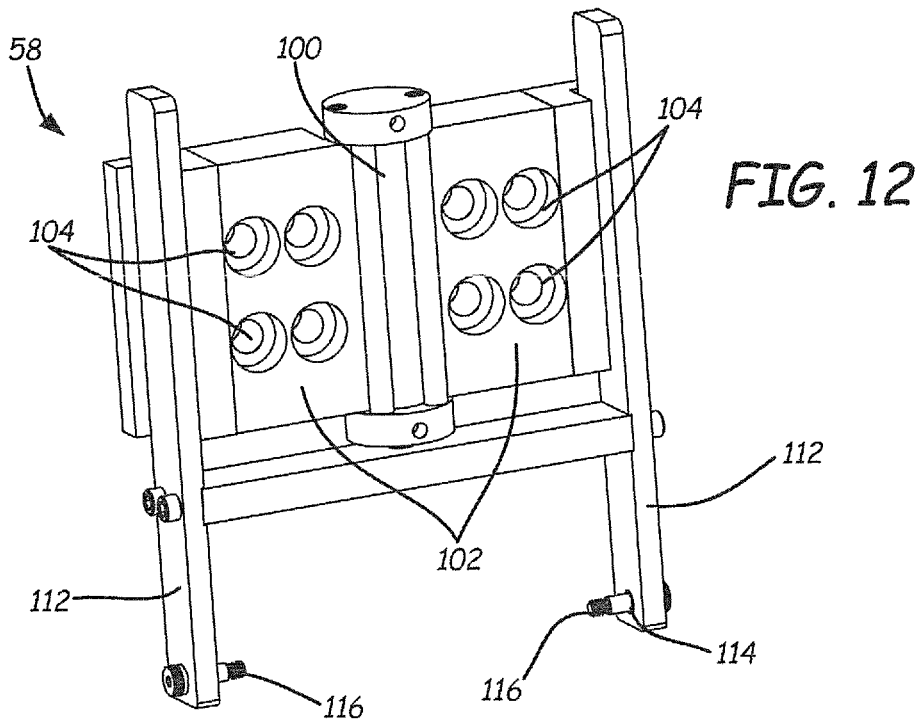
FIG. 12 is a perspective view of an exemplary sensor bracket used on the top, interior and bottom rail assemblies.

FIG. 11 is a perspective partial end view of bottom rail assembly 48 secured to pipe 30 of container 24. Often, a container 24 will include four pipes 30, the upper pipes 30 being visible in FIG. 1, and the lower pipes 30 being visible in FIG. 3. In an exemplary embodiment, pipe bracket 82 includes a first portion 88 attached to frame member 50 with fastener 90 and a second portion 92 attached to the first portion 88 by fasteners 94, to thereby clamp pipe 30 between the first and second portions 88, 92 of pipe bracket 82. FIG. 11 further shows a two part clamp 96, fastened together by fastener 98, which is used to secure pipe 30 to an interior of side wall 62 of container 24.

Referring to FIGS. 1, 10 and 11, for installation of bottom rail assembly 48 in container 24, in an exemplary embodiment, only small access openings 75 in an end wall panel 73 proximate the lower corners of container 24 are required for insertion of frame element 50 having first portion 88 of pipe bracket 82 fixed thereto. Frame element 50 of bottom rail assembly 48 is secured inside container 24 by clamping second portion 92 and first portion 88 of pipe bracket 82 together around pipe 30.

Thereafter, the plurality of sensor brackets 58, spaced apart from each other by intervening spacer bars 108, are attached to frame element 50 by moving rollers 84 from one end of frame element 50 toward the other end of frame element 50. To position sensor 34 to obtain information on pressure vessel 22, an actuation device 38 is actuated to move sensor 34 in direction 40, so that the sensing surface of sensor 34 contacts the outer surface of pressure vessel 22 with an appropriate coupling force. In exemplary embodiments, suitable actuation devices 38 include, for example, pneumatic cylinders, electric motors, and magnetic actuators. In an exemplary embodiment, direction 40 is substantially orthogonal to a tangent of the outer surface of pressure vessel 22.

After gathering and processing information from sensors 34 and data acquisition boxes 36, actuation devices 38 may be activated to retract sensors 34 away from the respective surfaces of pressure vessel 22 so that rail assemblies 32, 44, 46, 48 can be removed from container 24 in a reverse method of their installation. The rail assemblies 32, 44, 46, 48 can then be deployed on a different pressure vessel arrangement 20 for assessment of the structural integrity and estimated useful remaining life of a different set of pressure vessels 22.

For example, for removal of bottom rail assembly 48, in an exemplary embodiment, the connected line of multiple sensor brackets 58 and attached intervening spacer bars 108 can be pulled off one end of frame 50. Then, two portions 88, 92 of pipe bracket 82 can be disconnected, allowing frame 50 to be pulled out opening 75 in end wall 73 of container 24.

Lower interior rail assembly 46 can be rolled via casters 56 on the two bottom pressure vessels 22, out of opening 74 of end wall 73 of container 24, to thereby remove lower interior rail assembly 46 from space 64 between the pressure vessels 20. For removal of upper interior rail assembly 44, cable 68 is detached from hook 70 and upper interior rail assembly 44 is lowered so that casters 56 contact the two bottom pressure vessels 22. Upper interior rail assembly 44 can be rolled via casters 56 on the two bottom pressure vessels 22, out of opening 74 of end wall 73 of container 24, to thereby remove upper interior rail assembly 44 from space 64 between the pressure vessels 20.

For removal of upper rail assembly 32 from container 24, two portions 120, 128 of container bracket 42 can be disconnected, allowing their removal from sill 132 of side wall 62 of container 24. Frame 50 can be lifted out of container 24 so that a roof of container 24 can be replaced.

Although the subject of this disclosure has been described with reference to several embodiments, workers skilled in the art will recognize that changes may be made in form and detail without departing from the scope of the disclosure. In addition, any feature disclosed with respect to one rail assembly 32, 44, 46, 48 may be incorporated in another rail assembly 32, 44, 46, 48, and vice-versa.

The invention claimed is:

1. A method of mounting a first sensor with a vessel arrangement including at least first, second, third and fourth vessels, the vessel arrangement disposed in a container in a two-by-two stacked configuration having a central space, the method including:
   inserting a first interior rail assembly into the central space;
   positioning a first sensor on the first interior rail assembly proximate the first vessel;
   positioning a second sensor on the first interior rail assembly proximate the second vessel;
   moving the first sensor into contact with the first vessel upon actuation in a first direction; and
   moving the second sensor into contact with the second vessel upon actuation in a second direction.

2. The method of claim 1, including:
   attaching a top rail assembly to the container proximate a top of the container by attaching a bracket of the top rail assembly to a sill of the container; and
   positioning a third sensor on the top rail assembly proximate the first vessel.

3. The method of claim 1, including raising the first interior rail assembly in the central space.

4. A method of mounting a first sensor with a vessel arrangement including at least first, second, third and fourth vessels, the vessel arrangement disposed in a container in a two-by-two stacked configuration having a central space, the method including:

inserting a first interior rail assembly into the central space;

positioning a first sensor on the first interior rail assembly proximate the first vessel attaching a bottom rail assembly to the container proximate a bottom of the container; and rolling a sensor bracket on a frame of the bottom rail assembly.

5. The method of claim 1 comprising:

attaching a top rail assembly to the container proximate a top of the container; and positioning a third sensor on the top rail assembly proximate the first vessel.

6. A method of mounting a first sensor with a vessel arrangement including at least first, second, third and fourth vessels, the vessel arrangement disposed in a container in a two-by-two stacked configuration having a central space, the method including:

inserting a first interior rail assembly into the central space;

positioning a first sensor on the first interior rail assembly proximate the first vessel inserting a second interior rail assembly into the central space; and positioning a second sensor on the second interior rail assembly proximate the third vessel.

7. The method of claim 6 comprising positioning a third sensor on the second interior rail assembly proximate the fourth vessel.

8. The method of claim 1 comprising:

attaching a bottom rail assembly to the container proximate a bottom of the container; and positioning a third sensor on the bottom rail assembly proximate the fourth vessel.

9. The method of claim 1 wherein the second direction is substantially orthogonal to the first direction.

10. The method of claim 1 wherein inserting the first interior rail assembly into the central space includes rolling the first interior rail assembly upon at least one of the first, second, third and fourth vessels.

11. The method of claim 1 wherein inserting the first interior rail assembly into the central space includes rolling the first interior rail assembly upon two of the first, second, third and fourth vessels.

12. The method of claim 3 wherein raising the first interior rail assembly comprises using a hook attached to a cross bar.

13. The method of claim 3, including inserting a second interior rail assembly in the central space after raising the first interior rail assembly.

14. The method of claim 13 wherein inserting the second interior rail assembly into the central space includes rolling the second interior rail assembly upon at least one of the first, second, third and fourth vessels.

15. The method of claim 4 comprising using a pipe bracket to attach the bottom rail assembly to the container.

16. The method of claim 4, wherein the sensor bracket is one of a plurality of sensor brackets, the method comprising attaching a spacer bar between two adjacent sensor brackets of the plurality of sensor brackets.

* * * * *